United States Patent [19]

Cope et al.

[11] 3,809,328

[45] May 7, 1974

[54] FIELD AND ARMATURE CONTROL IN A REEL MOTOR SERVOMECHANISM

[75] Inventors: James R. Cope, Boulder; Everette R. McCully, Northglenn, both of Colo.

[73] Assignee: International Business Machines Corporation, Armonk, N.Y.

[22] Filed: Mar. 26, 1973

[21] Appl. No.: 344,795

[52] U.S. Cl. .................................... 242/184, 318/6

[51] Int. Cl.. G11b 15/06, G11b 15/58, G11b 23/12

[58] Field of Search ............................ 242/184–186; 318/6, 7

[56] References Cited

UNITED STATES PATENTS

| | | | |
|---|---|---|---|
| 3,259,330 | 7/1966 | Baybick et al. | 242/184 |
| 3,343,052 | 9/1967 | Youngstrom | 318/6 |
| 3,433,426 | 3/1969 | Brown et al. | 242/184 |
| 3,454,960 | 7/1969 | Lohrenz | 242/184 |
| 3,648,134 | 3/1972 | Audeh et al. | 318/6 |
| 3,713,606 | 1/1973 | Van Pelt et al. | 242/184 |

*Primary Examiner*—Leonard D. Christian
*Attorney, Agent, or Firm*—Francis A. Sirr

[57] ABSTRACT

A magnetic tape unit having vacuum column buffers which isolate a centrally located, low inertia capstan from two variable inertia tape reels and their high inertia, direct current motors. Each of the reel motor armatures is servo controlled from tape loop sensing transducers associated with its particular vacuum column. This armature servo control provides speed and direction control of the reel motors. The electromagnetic reel motor fields are servo controlled to control the motor's torque/speed capability in accordance with the tape unit's operational mode. When initially accelerating the reel from a rest condition, the reel motor's field is high, to thereby increase motor torque at the expense of motor speed. Once the reel has been accelerated, the motor's field is decreased, to thereby increase the motor's speed capability at the expense of motor torque. Thereafter, the motor's torque/speed characteristic is controlled in accordance with the quantity of tape on the reel. Specifically, the motor's torque is decreased, by decreasing its field, as the reel empties.

14 Claims, 8 Drawing Figures

FIG. 2
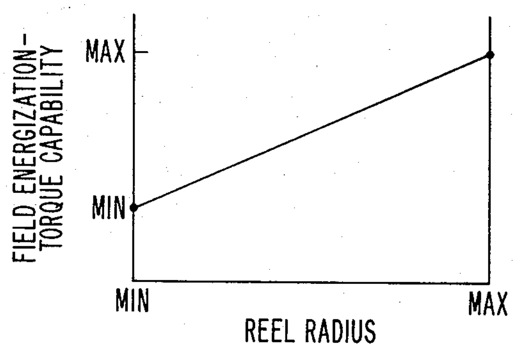
FIG. 3
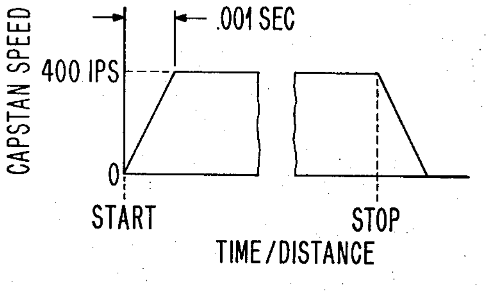
FIG. 4
| COLUMN ZONE | CAPSTAN DIRECTION | | |
|---|---|---|---|
| | FWD | STOP | BKWD |
| UPPER | D↓ | D↓ | B |
| MID | C | B | C |
| LOWER | B | D↑ | D↑ |
FIG. 5
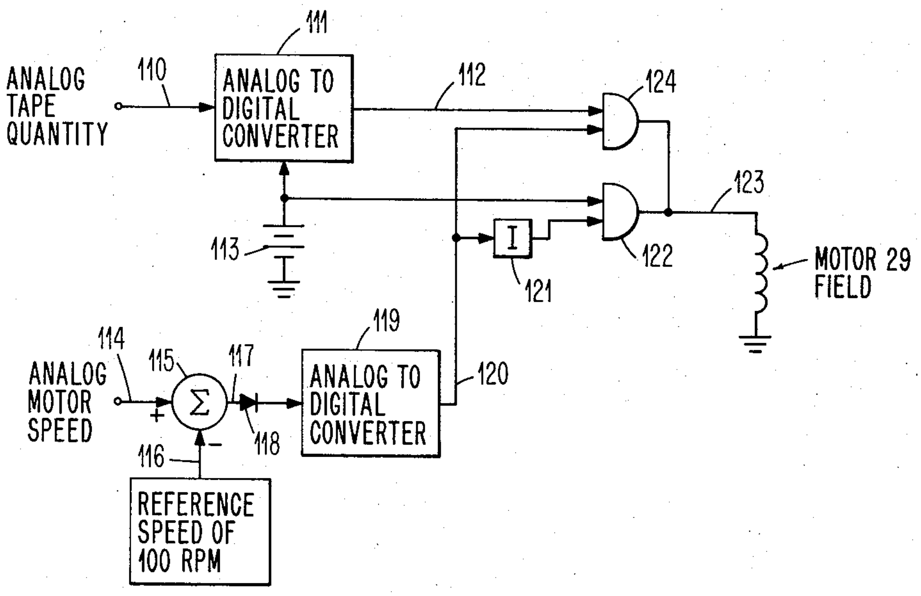

FIELD AND ARMATURE CONTROL IN A REEL MOTOR SERVOMECHANISM

BACKGROUND OF THE INVENTION

Vacuum column buffering is a widely used expedient to isolate a low inertia capstan from high inertia reels. By way of example, U.S. Pat. Nos. 3,057,568 and 3,057,569, issued to J. A. Weidenhammer and W. S. Buslik and to J. A. Weidenhammer, respectively, show double-capstan tape units having vacuum column buffering.

Single-capstan tape units of this type may use, for example, an integral capstan motor of the type shown in U.S. Pat. No. 3,490,672, issued to G. A. Fisher and H. E. Van Winkle. This motor is capable of accelerating a short length of one-half inch wide magnetic tape from a rest condition to a linear speed in excess of 200 inches per second in a few milliseconds. In a typical operating environment this capstan motor is called upon to operate at start/stop cycles approaching hundreds per second. The capstan operates to withdraw tape from one vacuum column buffer, and to deposit tape into the other buffer.

The vacuum columns are associated with tape loop sensors or transducers which monitor the loop's condition. These transducers may take many forms, and may be capable of measuring not only the quantity of tape in the column, but also the direction in which the quantity is changing, that is, increasing or decreasing, and the rate at which the quantity is changing. These transducers are used to servo control the reel motors, to thereby maintain an optimum tape quantity in the vacuum columns. By way of example, U.S. Pat. No. 3,550,878, issued to J. M Crisp and R. W. Van Pelt, and U.S. Pat. No. 3,673,473, issued to A. J. Werner, describe two means for servo controlling the reel motor's armature from vacuum column loop sensors.

A typical reel of one-half inch wide magnetic tape is 10½ inches in diameter. Its weight when full is approximately 2 pounds, and when empty approximately ¾ pound. The tape radius varies from about 5 inches when full to 2½ inches when empty. The inertial load which must be moved by the reel motor thus varies between limits, and the linear tape speed achieved by a given reel motor RPM continuously changes in accordance with the changing tape radius.

One of the main functions of a vacuum column buffer is to lengthen the allowable time interval during which the reel motor brings its section of tape up to the capstan's linear speed. As mentioned, the capstan achieves this speed in a few milliseconds. Because of the vacuum buffers, the reels are allowed a longer time interval, approaching a second, to achieve the capstan speed.

By the time the reel is up to speed, the capstan has displaced the tape loop from its desired column position, and therefore the tape at the reel must achieve a higher than capstan speed in order to reposition the loop.

An additional factor contributing to the difficult operational environment of the reel's servo is that the capstan may suddenly stop, and may in fact immediately reverse direction. All possible capstan movement sequences must be accommodated without allowing the tape loop to pull out of the column, or allowing the tape loop to bottom in the column.

While various prior art reel servos have been proposed, none provides the modes of armature servoing and field servoing of the present invention.

Prior art is known where the reel motor's servo control includes not only vacuum column loop sensing, but also reel radius sensing. Other prior art provides armature servo control for the reel motor from a loop position signal, a reel radius signal, and a reel speed/direction signal, along with servo control of the motor's field in accordance with the reel radius signal.

SUMMARY OF THE INVENTION

The present invention relates to the field of winding and reeling web-like material which carries machine-convertible information, and includes vacuum chamber buffering, loop condition responsive control, reel quantity sensing, and tape speed sensing.

The present invention provides improved means for servo controlling both a reel motor's armature and its field.

Specifically, the present invention provides high torque/low speed reel motor operation when the capstan first receives a command to start moving tape. When the reel has achieved a given speed, the reel motor operation changes to a low torque/high speed mode. Only in this second mode of operation is the reel motor capable of exceeding the capstan's linear speed.

More specifically, on initial command to begin moving the reel, as by the occurrence of a capstan start command, the reel motor's torque is enhanced, by controlling its field energization, at the expense of the motor's speed capability. However, once the reel is moving at a given speed, known to be less than that necessary to move tape at the capstan speed, reel motor torque is reduced, by decreasing its field energization, so that the reel motor can thereafter move tape as fast or faster than the capstan. When both the reel and the capstan are moving tape at the steady state speed, as determined by the linear capstan speed, the reel motor's torque/speed characteristic is continuously servo controlled, by controlling field energization, to insure quick speed change capability, consistent with the amount of tape on the reel. Namely, the motor's torque capability is allowed to decrease only as the reel empties.

The foregoing and other features and advantages of the invention will be apparent from the following more particular description of the preferred embodiments of the invention, as illustrated in the accompanying drawing.

BRIEF DESCRIPTION OF THE DRAWING

FIG. 2 is a graph showing the manner in which the reel motor's field energization varies from a maximum to a minimum as the reel's tape quantity varies from a maximum to a minimum, FIG. 3 is a graph showing capstan motion for a typical capstan start/stop operating cycle, FIG. 4 is a table showing a typical armature servo control order for the right-hand column and reel motor of FIG. 1, FIG. 5 shows a field servo structure in accordance with the present invention.

DESCRIPTION OF THE INVENTION

Figure 1:
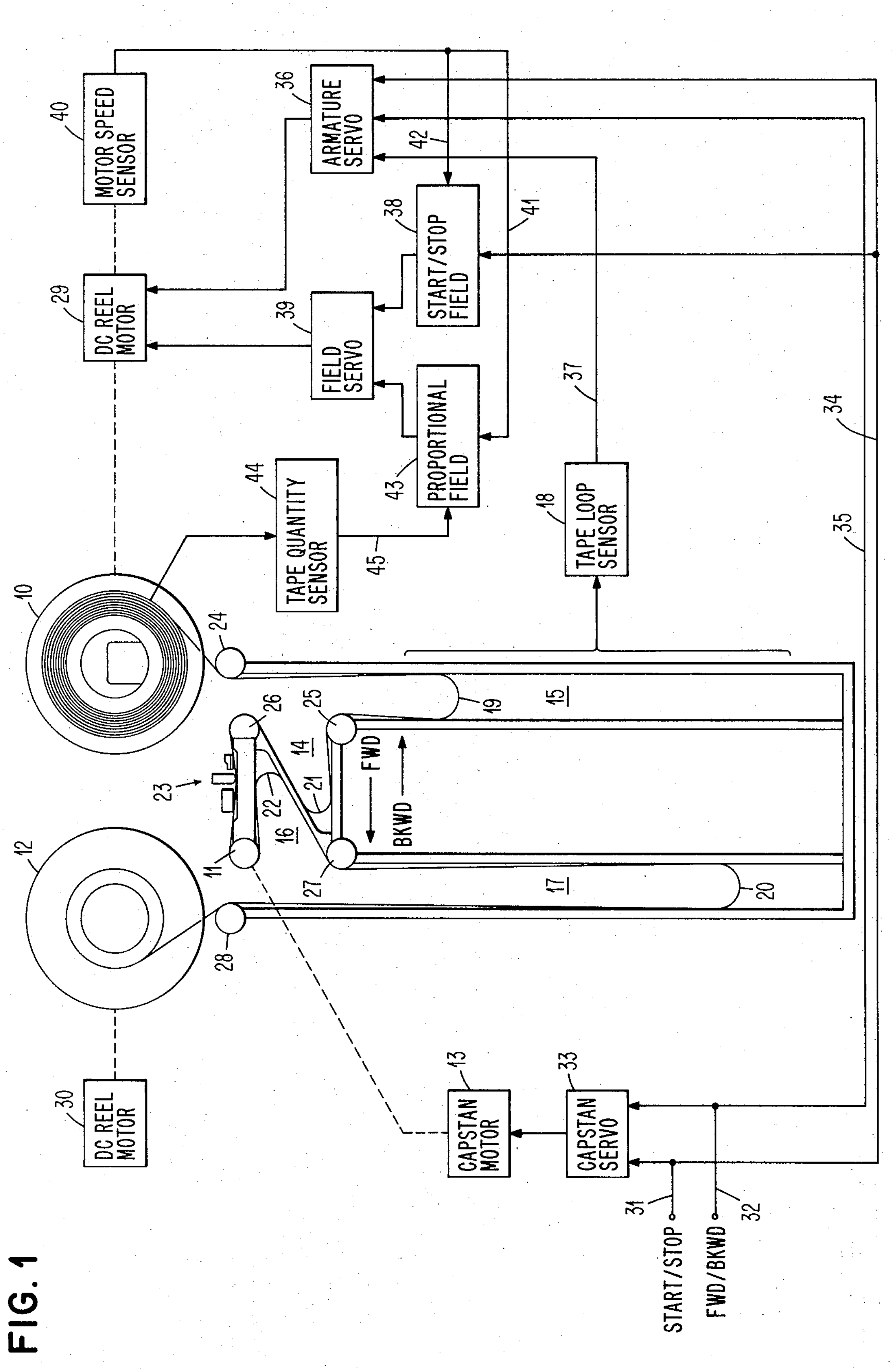
FIG. 1 shows a four-column magnetic tape unit including the present invention.

The magnetic tape unit schematically shown in FIG. 1 includes a removable reel 10 of magnetic tape, commonly called the file reel. One common form of reel is approximately ten and one-half inches in diameter and contains approximately 2,400 feet of one-half inch wide magnetic tape. Tape movement is controlled by a single bidirectional capstan 11. When tape moves in a forward direction, from right to left, the tape accumulates on a nonremovable reel 12, commonly called the machine reel. Capstan 11 is directly connected to a bidirectional, high torque/low inertia motor 13. This motor may, for example, be a permanent magnet DC motor, such as disclosed in the above-mentioned patent to G. A. Fisher et al.

The high torque/low inertia capstan environment is isolated from the high inertia reel environment by four vacuum columns 14, 15, 16 and 17. Columns 15 and 17 are parallel wall columns. Each of these columns includes tape loop sensing apparatus 18, one of which is shown associated with column 15. Column 17 includes a similar sensor, not shown. Sensor 18 may take many forms, as known to those of ordinary skill in the art. Two basic forms are those which either continuously sense the positions of loops 19 and 20, respectively, or, alternatively, sense the position of these loops in discrete zones within columns 15 and 17, respectively. In addition, such loop sensors may include means to detect not only the position of its associated loop, but also to detect the direction in which this loop is moving and the speed with which it is moving in that direction.

Columns 14 and 16 are tapered wall columns, such that the force exerted on tape loops 21 and 22 varies as a function of the length of the loop. These tapered wall columns, and their function, are described in U.S. Pat. No. 3,112,473, issued to H. P. Wicklund and H. A. Panissidi.

Each of the columns 14–17 includes a vacuum port, at or near the bottom of the column, and disposed beneath the tape loop, to facilitate the application of vacuum or subatmospheric pressure to the portion of the column below the tape loop.

As the tape leaves column 14 and passes over capstan 11 into column 16, while moving in a forward direction, it intimately cooperates in transducing relationship with a tape processing station 23. This tape processing station conventionally includes a read/write head, an erase head, a tape cleaner and a beginning of tape/end of tape (BOT/EOT) sensor.

As the tape moves from file reel 10 to machine reel 12, it passes over air bearings 24–28. The tape enters one of the columns 14, 16 and exits the other column, in accordance with capstan direction, moving at the steady capstan surface speed, for example 400 inches per second. The acceleration and deceleration distance/time interval of capstan 11 is extremely short. Thus, the tape in this portion of the magnetic tape unit can, for all practical purposes, be considered to be either at rest or running at a speed of 400 inches per second.

This, however, is not true of the tape speed adjacent reels 10 and 12. If it is desired to measure the tape's speed as it leaves or enters a reel, air bearings 24 and 28 can be replaced by tape driven tachometers whose output not only indicates the tape's speed but also the tape's direction. If a DC tachometer is used, the polarity of the tachometer's output voltage is an indication of tape direction, whereas the voltage magnitude is an indication of the tape's speed. It is also possible to use a two-phase digital tachometer which provides two phase-displaced cyclic output signals. The phase displacement of these two signals is an indication of the tape's direction, whereas the repetition rate or frequency of either one of the signals is an indication of the tape's speed.

Each of the reels 10, 12 is bidirectionally rotated or driven by direct current reel motors 29 and 30, respectively. In accordance with the present invention, the motor's field is provided by an electromagnetic means capable of servo energization. For simplicity, only the servo structure for reel motor 29 is shown, it being recognized that an identical structure is provided for motor 30.

Tape motion in the tape unit of FIG. 1 is under the primary control of capstan 11. This capstan initiates tape movement and disturbs the position of loops 19 and 20 in columns 15 and 17, respectively. As a result of loop movement, the armatures of reel motors 29 and 30, respectively, receive servo commands to rotate reels 10 and 12 in a direction to reposition the loops.

Control of tape motion is provided by conductors 31 and 32. These conductors control the capstan start/-stop and forward/backward movement, respectively. By definition, forward tape movement is provided by counterclockwise capstan rotation. Capstan servo 33, which may take many forms known to those of ordinary skill in the art, is controlled by the motion commands on conductors 31 and 32 to energize capstan motor 13 so as to provide the required direction of rotation and to maintain the rotational speed of motor 13 at a steady state value, to move tape at the assumed speed of 400 inches per second. Capstan servo 33 preferably includes means for sensing the actual speed of motor 13 so as to continuously adjust the speed thereof in accordance with well known closed loop servo techniques.

The tape motion commands from conductors 31 and 32 are also supplied to control reel motors 29 and 30, by way of conductors 34 and 35. In a high speed tape unit, such as one providing tape speed of 400 inches per second, it is desirable to immediately energize the reel motors to begin moving tape in the capstan direction as soon as commands are received on conductors 34 and 35, independent of the tape loop position at that time. Armature servo 36 responds to the capstan start command and the capstan direction command and is effective to energize the armature of motor 29, so as to cause the motor to begin rotating to move tape in the direction of capstan tape motion. In addition, armature servo 36 receives input information as to the condition of loop 19, by way of conductor 37. The information on conductor 37 is used by armature servo 36 to maintain an optimum length loop within column 15, in accordance with the direction of capstan 11. The preferred position for loop 19 is as shown in FIG. 1 when the capstan is moving tape in a forward direction. For this capstan direction, the loop in column 15 is preferably disposed in the upper portion of the column, whereas the loop in column 17 is preferably disposed in the lower portion of the column. When capstan 11 moves tape in a backward direction, from left to right, these preferred positions reverse. Namely, the loop within column 17 is maintained in an upper portion of the column and the loop within column 15 is maintained in a lower portion of the column. Armature servo 36 interrogates the input signals on conductors 34, 35 and 37, respectively, to achieve this optimum loop positioning within columns 15 and 17 by any one of a number of well known techniques. Examples of two such reel motor armature servos are shown in U.S. Pat. Nos. 3,550,878 and 3,673,473, issued to J. W. Crisp and R. W. Van Pelt, and to A. J. Werner, respectively.

In accordance with the present invention, each of the motors 29 and 30 includes an electromagnetic field which is servo controlled in a manner to dynamically change the torque/speed capability of these motors in accordance with the operating mode of the magnetic tape unit. More specifically, start/stop field network 38 is connected to respond to the momentary occurrence of either a start or a stop command for capstan 11 and to control field servo 39 so as to set the field of motor 29 to a high magnitude, thus providing high torque/low speed motor capability. By way of example, if the capstan start/stop signal on conductor 31 consists of a two-level signal, network 38 responds only to a transition in this signal from one level to the other. This is accomplished, for example, by differentiating the signal to detect only a signal level change. Upon the occurrence of such a change or transition, field network 39 is controlled to insure high field energization. As a result of high field energization, the torque capability of motor 29 is enhanced at the expense of its speed capability.

It is known that capstan 11 will quickly bring the tape from rest to a speed of 400 inches per second, as a result of a start command, or will, in the alternative, quickly bring the tape from the speed of 400 inches per second to rest in a very short time/distance interval. Thus, if armature servo 36 is to be successful in maintaining the position of loop 19, it is necessary that high torque be provided to accelerate or decelerate reel 10, as a capstan start or stop command is received, respectively. The above-described high field energization provides this required high torque.

A unique feature of the present invention is that the above-mentioned high torque/low speed mode of operation, as implemented by start/stop field network 39, is speed-limited to the extent that armature servo 36 is incapable of energizing the motor's armature so as to achieve a tape speed of 400 inches per second adjacent the reel. However, this high torque/low speed operation provides the initial reel acceleration/deceleration which is necessary when a capstan start or stop command is initially received.

The output signal of a motor speed sensor 40 is connected by way of conductor 41 to provide an additional input signal to start/stop field network 38. Sensor 40 is, in essence, a tachometer whose output is indicative of the rotational speed (rpm) of both the motor and its reel. Such a sensor may be of the direct current type wherein the polarity of the output voltage indicates direction, clockwise or counterclockwise, and the voltage magnitude indicates speed, the higher the magnitude, the higher the speed. Alternatively, such a sensor may be of the above-mentioned digital type wherein the pulse frequency of the output voltage or signal indicates speed, the higher the frequency, the higher the speed. If direction information is also desired in a digital sensor, two phases are provided and the phase relationships, which reverse 180° with rotation, provide an indication of direction. By way of a further example, the back EMF of motor 29 may be sensed as a measure of motor speed.

Speed sensor 40 provides an output signal which inhibits further operation of network 38 once reel 10 has been accelerated to a given rotational speed, known to be less than that necessary to move tape at 400 inches per second. When sensor 40 detects that reel 10 has been accelerated to this given speed, the output of sensor 40 provides an input control signal which not only inhibits further operation of network 38, but also provides an input control signal to enable operation of proportional field network 43. Thereafter, field servo 39 is controlled by network 43 to provide a motor torque/speed mode of operation consistent with the quantity of tape on reel 10.

More specifically, tape quantity sensor 44 is associated with reel 10 and provides an output signal on conductor 45 indicating to network 43 that reel 10 has a particular quantity of tape thereon, which quantity varies from full to empty. Proportional field network 43 and field servo 30 control the motor's torque capability such that it reduces as reel 10 empties. However, this control insures that the motor's torque capability is maintained sufficiently high to enable rapid acceleration or speed change under the control of armature servo 36.

Tape quantity sensor 44 may take many forms. Photoelectric devices are known which sense the quantity of tape on reel 10. Mechanical arms which engage the outer tape radius on the reel have also been provided. Furthermore, the speed of reel 10 has been compared to the speed of the tape as it enters or leaves the reel, and this speed comparison has been decoded as a measure of the quantity of tape on the reel.

In summary, the present invention as disclosed in FIG. 1 retains known methods of armature servo control for DC reel motors 29 and 30, these armature servo techniques being implemented by armature servo network 36. In addition thereto, the electromagnetic field of reel motors 29 and 30 receives variable servo energization. Namely, upon capstan 11 receiving a start command, start/stop field network 38 is effective to control field servo 39 so as to provide a high magnitude field for motors 29 and 30, thus insuring initial high torque/low speed motor operation. This mode of operation enhances the motors' ability to quickly accelerate reels 10 and 12, at the expense of top motor speed capability. When a motor has succeeded in accelerating its reel to a reference level, motor speed sensor 40 inhibits further operation of network 38 and enables operation of proportional field network 43. Thereafter, so long as a capstan stop command does not occur, motor field energization is dynamically controlled in accordance with the quantity of tape on the reel.

When a capstan stop command is received, network 38 again becomes operative to control field servo 39 in a manner to increase the magnitude of the motor's field energization. This increased field energization again enhances the motor's torque capability, at the expense of its speed capability. The motor is now able to quickly bring the reel to a stop, commensurate with the stop mode of capstan 11.

The manner in which the electromagnetic field of both reel motors 29 and 30 is controlled in accordance with the reel's tape quantity is shown in FIG. 2. From this figure it can be seen that when the tape's reel radius is at a minimum, the motor's field energization produces a minimum torque/maximum speed capability. Of course, actual motor speed and direction is controlled by armature energization. When the reel radius is at a maximum, that is, when the reel is full, the motor's torque capability is at a maximum and its speed capability is at a minimum. However, even at this minimum speed capability, armature servo 36 is capable to energize the reel motor so as to move tape at 400 inches per second, and higher. As the quantity of tape on reel 10 decreases, the quantity of tape on reel 12 increases. As a result, when the torque capability of reel motor 29 is decreasing, as tape moves in a forward direction, the torque capability of reel motor 30 is increasing.

FIG. 3 shows a typical capstan speed/time-distance curve. From this figure it can be seen that the capstan surface speed, and thus the tape's linear speed, increases from rest to 400 inches per second in the relatively short time of one millisecond. This acceleration is accomplished in a distance of a few tenths of an inch. The time period of constant running at 400 inches per second is variable. However, at the end of this interval a stop command is received and the capstan quickly brings the tape speed to rest in a period of approximately one millisecond.

FIG. 4 is a table which shows a typical reel motor control order for the armature servo. This control order is the control order for reel motor 29 associated with right-hand column 15 of FIG. 1. From this table it can be seen that when the capstan is moving in a forward direction, removing tape from column 15, armature servo 36 is operative to energize the armature of motor 29 to rotate reel 10 in a clockwise direction, supplying tape to column 15, so long as the tape loop is in an upper zone of column 15. When motor 29 has succeeded in accelerating the tape leaving reel 10 to a speed greater than 400 inches per second, loop 19 begins to move downward. When the loop has been repositioned to the midzone of column 15, armature servo 36 deenergizes the motor's armature and the motor coasts. If this coast mode of operation does not succeed in reducing the speed with which reel 10 is supplying tape to column 15, the loop continues to move in a downward direction into the lower zone. When this occurs, the danger exists that loop 19 may bottom in column 15. As a result, armature servo 36 receives a command, on conductor 37, to dynamically brake, or short, the armature of motor 29. In the alternative, armature servo 36 could plug or reverse energize the motor's armature, quickly reducing its speed in the clockwise direction.

As a result of FIG. 4's mode of armature energization, the stable loop position of loop 19 is such that the loop oscillates between the column's upper and midzones while the capstan is moving in a forward direction, and oscillates between the mid and lower zones when the capstan is moving in a backward direction.

As soon as capstan 11 receives a command to stop, the mode of armature energization for the reel motors changes such that both loops move to the midzone.

The table of FIG. 4 may be modified in many respects, for example, one modification provides instantaneous energization of the motor's armature as above described, to move the reel in the capstan direction, the instant that a capstan start command is received, this being independent of tape loop position. Once the reel has achieved a given speed in the capstan direction, the "FWD" or "BKWD" control order of FIG. 4 then becomes effective.

The detailed construction of field servo 39, start/stop field network 38 and proportional network 43 may take many forms, as is apparent to those of ordinary skill in the art.

FIG. 5 shows a specific structure of this type. In this case, it is assumed that tape quantity sensor 44 and motor speed sensor 40 are analog devices whose output signal magnitude increases with tape quantity and motor speed, respectively. The tape quantity output at conductor 110 controls ADC (analog-to-digital converter) 111 such that its output, on conductor 112 is a portion of field supply source 113. This portion varies from a maximum to a minimum, as shown in FIG. 2.

The reel motor speed output at conductor 114 is applied to summing junction 115 where it is summed with an opposite polarity signal 116 representing a reference motor speed of 100 revolutions per minute. When the reel motor has been accelerated to a speed greater than 100 rpm, a positive voltage on conductor 117 passes through diode 118 and controls DAC (digital-to-analog converter) 119. DAC 119 is of the type which provides a steady state control voltage at conductor 120 so long as the motor speed is greater than 100 rpm.

The absence of a control voltage on conductor 120 is indicative of a motor speed less than 100 rpm. So long as this condition exists, operation of inverter 121 is effective to enable power gate 122. With this gate enabled, the full magnitude of supply 113 is applied to the motor field by way of conductor 123. Thus, the motor is placed in the above-described high torque/low speed mode of operation.

Once this high torque/low speed operation has succeeded in achieving a motor speed greater than 100 rpm, a control voltage appears on conductor 120. This control voltage now inhibits further operation of gate 122 and enables power gate 124. Gate 124 thereafter applies a portion of supply 113 to the motor's field, in accordance with the quantity of tape on reel 10.

The above description relates to a capstan start occurrence and to the subsequent capstan running interval. When a capstan stop command occurs, gate 124 is immediately inhibited and gate 122 is enabled, to thereby once again institute a high torque/low speed mode, to insure fast stopping capability for motor 29.

Figure 6:
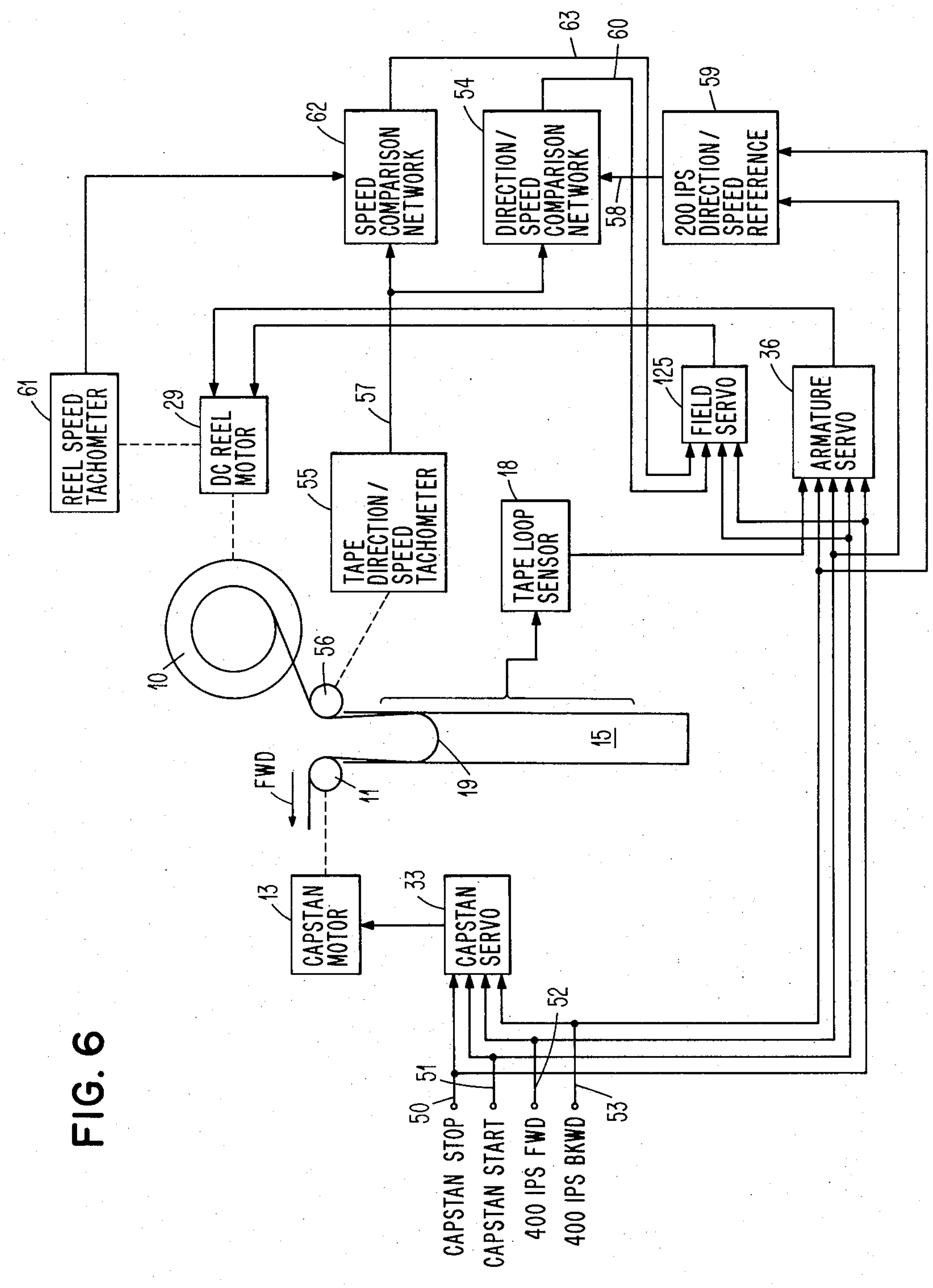
FIG. 6 is a schematic showing of the right-hand column of a two-column magnetic tape unit including the present invention.

FIG. 6 is a schematic showing of only the right-hand, parallel wall column 15 of a two-column magnetic tape unit having the same general characteristics as the tape unit of FIG. 1. Again, capstan 11 and reel 10 are located on opposite sides of column 15. Capstan motion is controlled by capstan servo 33. The speed and direction of the reel is controlled by armature servo 36. The torque/speed capability of reel motor 29 is controlled by field servo 125, as above described.

In the structure of FIG. 6, capstan servo 33 is controlled by four inputs, designated capstan stop, capstan start, 400 ips (inches per second) forward and 400 ips backward, respectively. As with FIG. 1, all four of these commands are supplied to armature servo 36 so that the armature servo may interrogate these commands to determine whether the capstan has just been issued a start command or a stop command, and in what direction the capstan is moving tape. If a start or a stop command has just been received, the forward/backward commands are interrogated to determine whether the loop in column 15 is expected to increase in length or decrease in length. As with the apparatus of FIG. 1, a capstan start command and the capstan direction command are effective to immediately energize the armature of motor 29 to begin reel rotation and tape motion in the same direction as capstan motion.

Field servo 125 of FIG. 5 also receives the capstan start and the capstan stop commands such that the instantaneous occurrence of one of these commands is effective to set field energization of motor 29 to a high magnitude, thus insuring high torque motor operation to assist the armature servo in quickly changing the speed of the reel, as the capstan quickly accelerates or decelerates. When a capstan start command occurs, reel motor 29 is maintained in its high torque/low speed mode of operation until direction/speed comparison network 54 decodes the fact that the tape leaving reel 10 is both moving in the same direction as the capstan tape motion, and that its speed has reached a reference speed known to be less than the capstan speed.

In the structure of FIG. 6, a tape direction/speed tachometer 55 is connected to a roller 56 adapted to be driven by tape as it enters or leaves reel 10. As mentioned above, this tachometer may be one of a number of tachometers which provides not only tape speed information but also tape direction information. The output of tachometer 55 is provided on conductor 57 and this output is connected to the input of direction/speed comparison network 54. The direction component of signal 57 is first compared to the direction component of a reference signal provided on conductor 58. In the example chosen, reference signal 58 provides a constant magnitude speed characteristic indicating 200 inches per second. The direction characteristic of signal 58 changes in accordance with the direction of capstan movement. For example, when the capstan receives a command to move in a forward direction, reference signal 58 provides a direction parameter indicating forward direction and a magnitude parameter of 200 ips, this being one-half the capstan tape speed.

By way of example, if tachometer 55 is a DC type device, the polarity of its output signal indicates direction and the magnitude of its output signal indicates tape speed. Thus, reference signal 58 has two changeable polarity states in accordance with capstan direction, and has a steady state magnitude indicative of a tape speed of 200 ips.

Direction/speed comparison network 54 first makes a comparison to insure that the tape adjacent reel 10 is moving in the same direction as capstan motion. Only when this condition is satisfied does comparison network 54 make a second comparison of the tape speed adjacent the reel to the reference tape speed of 200 ips. Once these two conditions are satisfied, namely that the tape adjacent the reel is moving in the same direction as the capstan and the tape adjacent the reel has been accelerated to at least 200 ips, an active output is provided on conductor 60. This active output is effective to control field servo 125 in a manner to decrease the field energization of motor 29. This decreased field energization provides a lower torque/higher speed capability for the motor, thus insuring that once motor 29 has accelerated the reel to move tape at 200 inches per second, armature servo 36 will thereafter be able to continue reel acceleration so as to achieve and in fact exceed the capstan tape speed of 400 ips.

Thereafter, with the motor operating with high speed capability, loop position sensor 18 is effective to dynamically control armature servo 36 to maintain tape loop 19 at a desired optimum position within column 15.

Furthermore, tachometer 55 now cooperates with tachometer 61 to dynamically control the reel motor's torque/speed capability in accordance with the quantity of tape on reel 10. More specifically, speed comparison network 62 compares the output of tachometer 61 to the speed parameter of tachometer 55. From this comparison a calculation is made as to the quantity of tape on reel 10. This comparison is based upon the fact that the larger the quantity of tape on reel 10, the larger will be the tape's radius and the slower will be the rotational speed of motor 29 for a given tape speed at tachometer 55. The comparison made by network 62 provides an output on conductor 63 which proportionally controls the magnitude of the reel motor's field energization in accordance with reel radius or quantity, as shown in FIG. 2.

Figure 7:
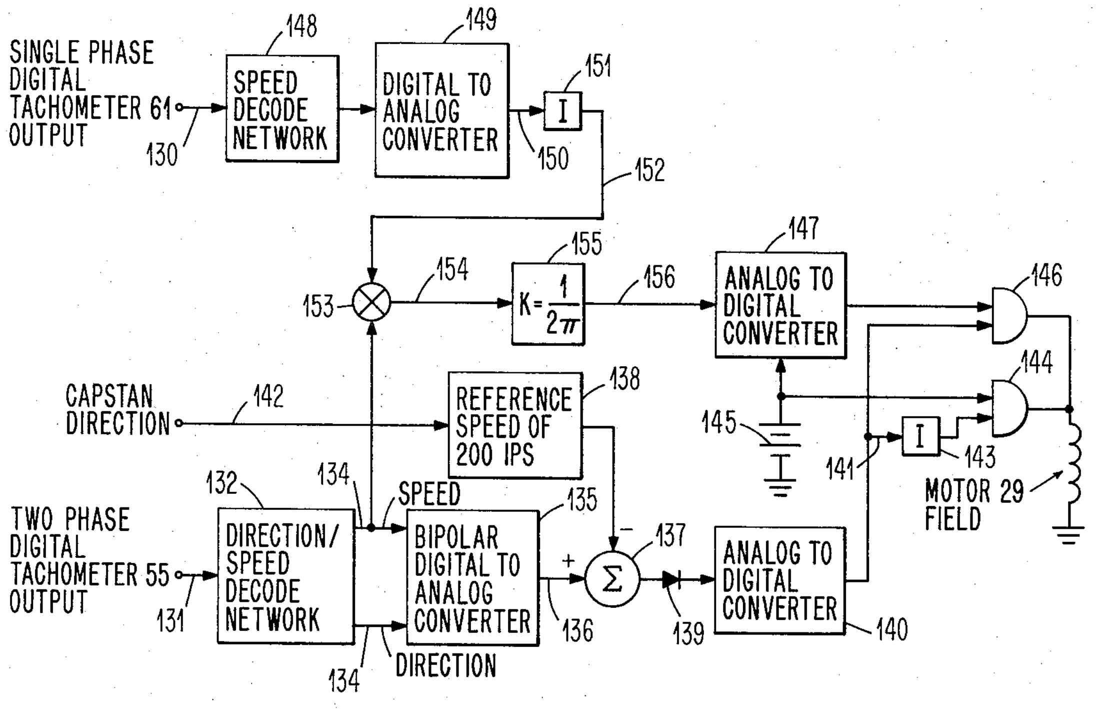
FIG. 7 shows another form of field servo structure in accordance with the present invention.

One form of field servo control is shown in FIG. 5, above described. FIG. 7 shows another specific structure of this type wherein digital tachometers 55 and 61 of FIG. 7 provide a reel motor speed signal and a tape direction/speed signal on conductors 130 and 131, respectively.

Signal 131 consists of two 90° phase displaced alternating signals whose phase relationship is a measure of the tape's direction at roller 56, and whose frequency is a measure of the tape's speed. Signal 130 consists of a single phase alternating signal whose frequency is a measure of the motor and reel speed. Of course, the tape leaving the reel and the tape at roller 56 will always be moving in the same direction and at the same linear speed.

The first of the required comparisons is a comparison of the capstan direction to the direction of the tape at roller 56. Signal 131 is supplied to a direction/speed decode network 132 which provides a signal on conductor 133 indicating the tape direction, and a signal on conductor 134 indicating the tape's speed. Decode network 132 is of the well known type which senses the phase relationship of the two tachometer phases as a measure of direction, and measures the time interval of a cycle of one of the two tachometer phases as a measure of speed.

The tape's direction and speed control bipolar DAC 135. The DAC output, at conductor 136, is of a polarity indicative of the tape direction at roller 56, whereas its magnitude is indicative of the tape's speed. This DAC output is compared to a reference speed of 200 ips, or one-half the capstan speed. This comparison is made at summing junction 137, which junction receives the reference speed signal from network 138. When the tape's speed at roller 56 exceeds 200 ips, and is in the same direction as the capstan, diode 139 conducts and enables ADC 140.

The active output of ADC 140, at conductor 141, indicates that reel motor 29 has succeeded in accelerating reel 10 so as to establish the reference tape speed of 200 ips at roller 56 and in the same direction as the capstan.

In actual practice, network 138 is controlled by a capstan direction signal on conductor 142. In this manner, network 138 is capable of supplying a bipolar signal to junction 137. As a result, FIG. 6 would include an opposite-polarity diode, similar to diode 139, and gates controlled by the capstan direction signal so as to facilitate the proper direction comparison with the bipolar output of DAC 135.

The absence of an active output on conductor 141 indicates that high torque/low speed operation of motor 29 is required. In response thereto, inverter 143 enables power gate 144. This gate connects the full amplitude of field energizing source 145 to the motor's field to thereby institute this mode of operation.

However, once the initial reel motor acceleration has been accomplished, gate 144 is inhibited and power gate 146 is enabled. This power gate allows a portion of source 145 to be applied to the motor's field, as controlled by ADC 147.

Specifically, the reel motor speed, as represented by signal 130, is decoded by speed decode network 148 and DAC 149 is thereby controlled to supply an analog voltage at conductor 150 as a measure of reel motor speed. Inverter 151 functions to provide a reciprocal of the motor speed signal at conductor 152. This signal is applied to multiplier junction 153 along with the tape speed signal at conductor 134. As a result of this multiplication, the signal at conductor 154 is a measure of the inches of tape entering or leaving the reel for each revolution of the reel motor. This signal is applied to a constant network 155 which weights the signal by the factor $1/2\pi$. In this manner, control input 156 to ADC 147 is a measure of reel tape radius and thus tape quantity.

This tape quantity signal controls the amplitude of output of ACD 147. This amplitude servo controls the motor's field energization, once gate 146 is enabled.

The above description has dealt with a capstan start, followed by a capstan run interval. When a capstan stop command is received, gate 146 is inhibited and gate 144 is enabled, to thereby place the motor in a high torque mode to insure rapid stopping of the reel.

Figure 8:
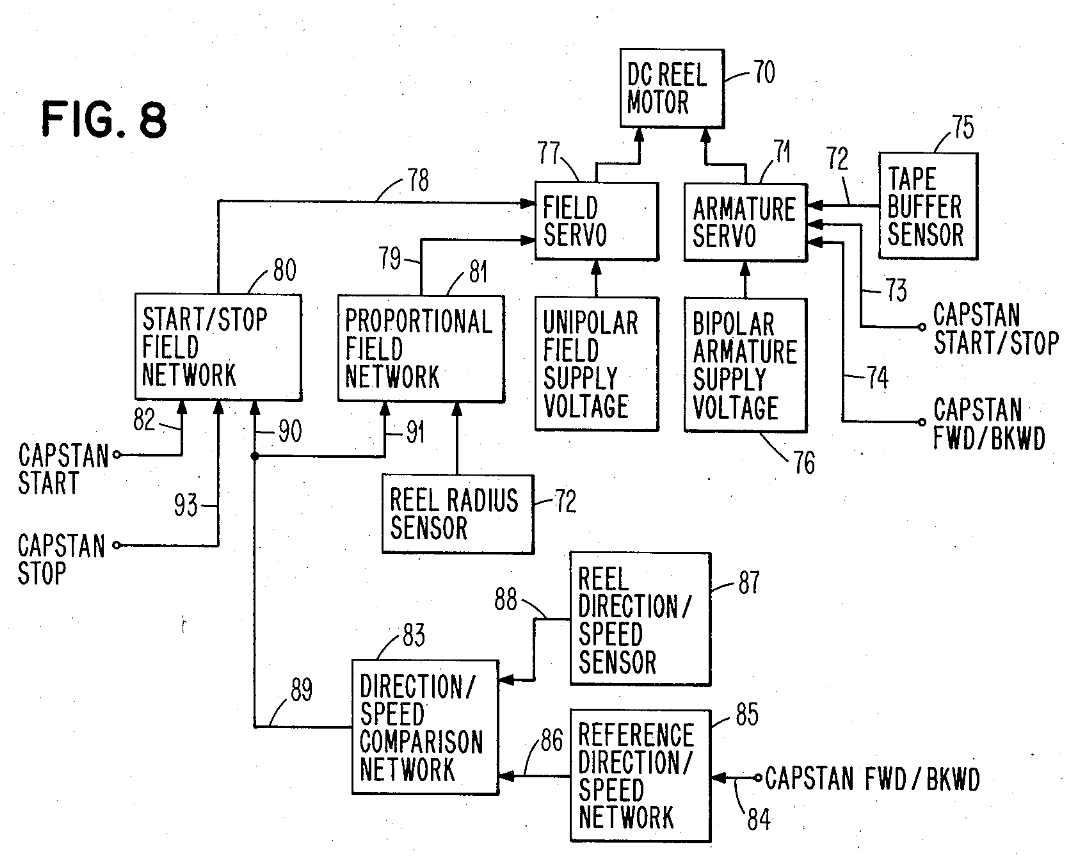
FIG. 8 is another schematic showing of the present invention.

FIG. 8 discloses another manner of controlling both the armature energization and the field energization of the reel motors. The armature of DC reel motor 70 is energized by armature servomechanism 71 in accordance with input control signals received on conductors 72, 73 and 74. The signal on conductor 72 is provided by tape buffer sensor 75. Sensor 75 may take a variety of forms, as well known in the art. If maximum resolution is desired, sensor 75 provides an output signal not only indicating the quantity of tape in the tape buffer, but also provides an indication of the direction in which the quantity is changing, as well as the rate at which the quantity is changing.

The signal on conductor 73 indicates to the armature servo that the capstan has just received a command to start moving tape, or, alternatively, the capstan has just received a command to stop tape movement. The signal on conductor 74 is present only when the capstan is moving tape and indicates capstan direction, that is, a forward direction or a backward direction. In accordance with the signals on conductors 72–74, armature servo 71 controls both the polarity and the magnitude of armature energization for reel motor 10, this energization being provided from bipolar armature supply voltage source 76. The polarity component of this energization determines the direction in which the reel motor will rotate, whereas the magnitude component determines the speed with which the motor will rotate. The present invention contemplates that armature servo 71 may provide continuous energization of the reel motor's armature, or may, alternatively, provide on-off, bang-bang, or pulse width modulation (PWM) servo control of the reel motor's armature.

The field of motor 70 is controlled by field servo 77, in accordance with input commands received on conductors 78 and 79. As will be apparent, only one of the inputs 78, 79 is effective at any one time.

The input on conductor 78 is provided by start/stop field network 80 which, when operative, sets a maximum field (high torque/low speed) operating condition for motor 70. The signal on conductor 79 is provided from proportional field network 81 which controls the motor's field between a maximum and minimum condition as the amount of tape on the reel varies from a maximum to a minimum condition, respectively, as shown in FIG. 2.

More specifically, when start/stop field network 80 receives a capstan start command, on conductor 82, network 80 is effective to control field servo 77 to provide a maximum field for motor 70, independent of the quantity of tape on the reel at that time. This maximum torque/minimum speed motor operating condition insures that the motor will accelerate the reel to a given condition in a minimum time interval. However, it is also known that with this maximum field energization, armature servo 71 is unable to achieve the high capstan tape speed.

In order to facilitate optimum control of the motor's field, direction/speed comparison network 83 inhibits operation of start/stop field network 80 and enables proportional field network 81 when reel motor 70 has been accelerated to the given condition. More specifically, when the reel motor has achieved a given tape speed, known to be less than the capstan tape speed, start/stop field network 80 is inhibited and proportional field network 81 is enabled. The capstan direction command on conductor 84 provides an input to reference direction/speed network 85 such that its output, on conductor 86, provides a direction/speed reference which must be matched by the tape as it leaves or enters the reel. The tape direction and speed adjacent the reel is sensed by tape direction/speed sensor 87 whose output, on conductor 88, is compared to the reference signal on conductor 86. The first comparison made by network 83 is to compare the signal on conductor 88 to that on 86 to determine that the tape adjacent the reel is moving in the same direction as the capstan. Once network 83 determines that this condition is satisfied, the network goes on to make a second comparison of the speed of the tape adjacent the reel to the reference speed.

By way of example, the capstan tape speed may be 400 inches per second in either the forward or the backward direction. The reference speed provided on conductor 86 is lower than this 400 ips speed and is, for example, 200 ips. Thus, when reel motor 70 has succeeded in accelerating the reel so that the tape adjacent thereto is moving in the same direction as the capstan and at a speed equal to or greater than 200 ips, comparison network 83 provides an output signal on conductor 89. This output signal is effective to inhibit further operation of start/stop field network 80, by way of conductor 90, and to enable operation of proportional field network 81, by way of conductor 91.

Network 81 is now operable to proportionally control field servo 77 in accordance with the quantity of tape on the reel, as measured by reel radius sensor 92.

Proportional field control network 81 is operable to implement the field energization-versus-reel radius as shown in FIG. 2. That is, when the reel radius is at a maximum, field energization and torque capability of motor 70 are at a maximum, whereas when the reel radius is at a minimum, field energization is likewise at a minimum. It is important to note that the torque/speed capability of reel motor 70 as expressed in FIG. 2 is such that armature servo 71 is capable of exceeding the capstan speed of 400 ips even when the field energization is set at a maximum value. However, as the quantity of tape on the reel decreases, field energization also decreases to thereby enhance the reel motor's speed capability, at the expense of the motor's torque capability. So long as the capstan continues to move tape in the same direction, either forward or backward, armature servo 71 is effective to maintain the tape loop at an optimum quantity of tape in the tape buffer.

If it is assumed that the capstan now receives a stop command, comparison network 83 immediately inhibits proportional field network 81 and enables start/stop field network 80 by virtue of the absence of an output signal on conductor 89. Furthermore, the occurrence of a capstan stop command provides a signal on conductor 93 which causes start/stop field network 80 to again provide high field energization for reel motor 70.

Armature servo 71 senses the occurrence of a capstan stop command, on conductor 73, and compares this command to the previous direction of capstan movement, that is, the signal which previously existed on conductor 74, to determine the direction of armature energization which is necessary to plug reel motor 70. Plugging energization of this motor, with the maximum field established by network 80, insures that the reel motor is quickly brought to a stop. This plugging may be maintained until buffer sensor 75 indicates that the reel motor is stopping commensurate with the capstan, whereupon dynamic braking of the reel motor occurs.

If it is assumed that the capstan makes a dynamic reversal, that is, the capstan command makes a rapid transition from, for example, forward start to stop to backward start, reference direction/speed network 85 quickly establishes a reference speed of 200 ips in the opposite direction at conductor 86. At this time reel motor 70 has not had time to reverse direction and even though the tape speed adjacent the reel may at this time be greater than 200 ips, direction/speed comparison network 83 fails to make the required direction comparison and no output occurs at conductor 89. Start/stop field network 80 is thereby enabled and reel motor 70 is provided with maximum field to first stop the reel motor and to thereafter begin accelerating the reel in the opposite direction, this being the new direction of the capstan. Once the reel motor has achieved a speed of 200 ips in this new direction, comparison network 85 again makes the proper comparison, causing network 80 to be inhibited and enabling network 81, whereupon field servo 77 is again operative to control the magnitude of field energization in accordance with the quantity of tape on the reel, as expressed by FIG. 2.

In this manner, the present invention utilizes start/-stop network 80 to either quickly decelerate reel motor 70 when the capstan receives a stop command, or to alternatively quickly stop and then reverse the direction of the reel motor upon a dynamic reversal of the capstan.

While the invention has been particularly shown and described with reference to preferred embodiments thereof, it will be understood by those skilled in the art that various changes in form and details may be made therein without departing from the spirit and scope of the invention.

What is claimed is:

1. In a magnetic tape unit wherein a tape buffer isolates a low inertia capstan from a high inertia reel, wherein the capstan moves tape through a transducing station in a start/stop mode at a given speed, wherein a direct current motor is connected to rotate the reel, and wherein the reel motor's armature is servo controlled in accordance with the tape in the buffer, the improvement comprising:

a field control servo operable to variably energize the reel motor's field, first means operable upon capstan start and effective to control said field control servo to produce high torque/low speed operation of the reel motor, said operation being capable of rapid reel acceleration, but being incapable of moving tape at said given capstan speed, and second means responsive to a given condition of reel motor motion and effective to control said field control servo to produce lower torque/higher speed operation of the reel motor when said high torque/low speed operation has achieved a tape speed which is less than said given capstan speed, said lower torque/higher speed operation having the capability of moving tape at a speed greater than said given capstan speed.

2. A magnetic tape unit as defined in claim 1 wherein said first means includes means operable during capstan stop to control said field control servo to produce high torque/low speed operation of the reel motor to insure rapid reel deceleration.

3. A magnetic tape unit as defined in claim 1 including third means responsive to the quantity of tape on the reel and effective to control said field control servo to dynamically produce a torque/speed operation of the reel motor in accordance with said quantity of tape, the motor's torque capability being reduced and the motor's speed capability being increased as said quantity of tape reduces.

4. A magnetic tape unit as defined in claim 3 wherein said third means includes a comparison network effective to compare the speed of said reel motor to the speed of the tape adjacent the reel, and providing an output indicative of the quantity of tape on the reel.

5. A magnetic tape unit as defined in claim 4 wherein said comparison network receives a first input signal from a reel motor tachometer and a second input signal from a tape driven tachometer cooperating with the tape adjacent the reel.

6. A magnetic tape unit as defined in claim 1 wherein said second means includes a comparison network effective to compare the speed of the tape adjacent the reel to a reference speed which is known to be less than said given capstan speed.

7. In a magnetic tape unit wherein a tape loop is maintained in a vacuum column to thereby isolate a low inertia capstan from a high inertia reel, an improved reel motor servomechanism comprising:
- a field control servo,
- an armature control servo,
- first means responsive to a capstan movement command to control said field servo so as to set a high magnitude field, and to additionally control said armature servo to control reel motion commensurate with the capstan movement command,
- motor motion sensing means responsive to the state of motor motion;
- second means controlled by said motor motion sensing means and operable upon initial acceleration of the motor after a capstan start command is received to control said field servo to set a low magnitude field,
- loop position sensing means responsive to the vacuum column tape loop, and
- third means controlled by said loop sensing means operable to control said armature servo to maintain an optimum loop condition in said column.

8. A magnetic tape unit as defined in claim 7 wherein said motor motion sensing means is a tape speed sensing tachometer and wherein said initial acceleration condition of said motor indicates that the tape speed has reached a value less than the capstan tape speed.

9. A magnetic tape unit as defined in claim 8 wherein said first means is operable to set a high magnitude field upon the initial occurrence of either a capstan start or a capstan stop command.

10. A magnetic tape unit as defined in claim 9 including, fourth means responsive to the quantity of tape on said reel and operable to dynamically vary the magnitude of field energization in accordance with the amount of tape on said reel.

11. A magnetic tape unit as defined in claim 10 wherein said fourth means includes a speed sensing means driven by said reel motor and a speed sensing means driven by the tape adjacent said reel.

12. In a magnetic tape unit wherein a tape buffer isolates low inertia capstan means from a high inertia reel of variable tape quantity, the improvement comprising:
- a reel motor having an electrically energizable field and an electrically energizable armature, said motor being operably connected to rotate said reel,
- field servo means operable to variably energize said motor field,
- armature servo means operable to variably energize said motor armature,
- sensor means responsive to the tape in said buffer and operably connected to control said armature servo means to maintain a given tape condition in said buffer,
- first means responsive to a command to begin movement of said capstan means and effective as a result thereof to control said field servo means to institute a high torque/low speed capability for said motor, and
- second means responsive to said motor achieving a given state of reel rotation and operable as a result thereof to institute a lower torque/higher speed capability for said motor.

13. A magnetic tape unit as defined in claim 12 wherein said second means is controlled by means responsive to the quantity of tape on said reel and is operable in response thereto to set a variable torque/speed capability whose torque parameter decreases as the tape quantity decreases.

14. A magnetic tape unit as defined in claim 13 including third means operable during stop movement of said capstan means and effective to control said field servo means to institute a high torque capability for said motor.

* * * * *